July 26, 1932.  W. LAM  1,868,609
PLANT PROPAGATING DEVICE
Filed June 14, 1929
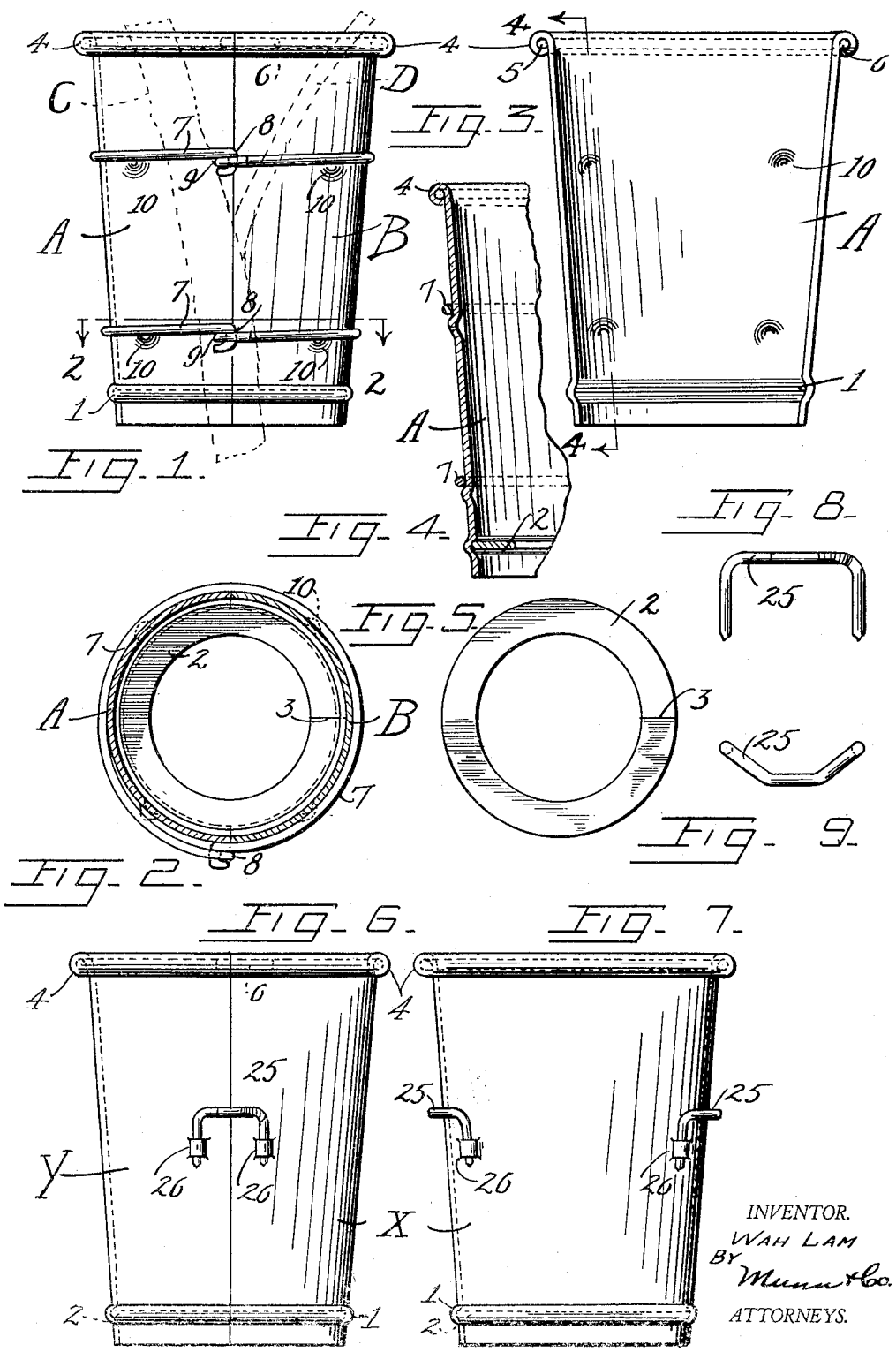
INVENTOR.
WAH LAM
BY Munn & Co.
ATTORNEYS.

Patented July 26, 1932

1,868,609

UNITED STATES PATENT OFFICE

WAH LAM, OF HONOLULU, TERRITORY OF HAWAII

PLANT PROPAGATING DEVICE

Application filed June 14, 1929. Serial No. 370,899.

My invention relates to improvements in plant propagating devices, and it consists in the combinations, constructions and arrangements hereinafter described and claimed.

An object of my invention is to provide an improvement over that form of the device shown in my co-pending application on a transplanting pot, Serial No. 336,211, filed January 30th, 1929.

A further object of my invention is to provide a plant propagating device that is especially designed to be used in connection with grafting trees and the like. To this end, the device is provided with two sections that are removably secured to each other, and these sections are held together by fastening means of a simple structure.

Other objects and advantages will appear in the following specification, and the novel features of the device will be particularly pointed out in the appended claims.

My invention is illustrated in the accompanying drawing forming a part of this application, in which Figure 1 is a side elevation of the device;

Figure 2 is a section along line 2—2 of Figure 1;

Figure 3 is a view of one of the sections;

Figure 4 is a section along the line 4—4 of Figure 3;

Figure 5 is a plan view of the removable bottom;

Figures 6 and 7 are side elevations taken at right angles to each other of a modified form of the device; and Figures 8 and 9 are side and top views respectively of one of the fastening means.

In carrying out my invention, I provide a plant propagating device consisting of two identical sections, A and B. Each section is semi-conical in shape, and the two, when abutted together, form a complete pot that has the usual inclined sides.

At the bottom of the pot, I fashion grooves 1 for receiving a removable bottom 2 of the shape shown in Figure 5. The bottom 2 is a ring that is split, as at 3. The diameter of the ring is large enough to be received in the groove 1 and to be held in place when the two halves A and B are secured together.

At the top of the pot, I form a bead 4. This bead acts as a reinforcing member and also provides a recess 5. Each of the sections A and B is provided with a bead and each bead carries a pin 6 that extends a slight distance beyond one end of the bead. The extending end of each pin is received in the recess formed by the bead in the opposite half. This construction provides a rigid top to the pot that is continuous.

The two sections A and B are secured together by wires 7. Each wire is provided with hook-shaped ends 8 and 9. The sections A and B are provided with struck-up portions 10 over which the wires are forced, and these portions secure the wires in position and the wires in turn hold the sections together.

From the foregoing description of the various parts of the device, the operation thereof may be readily understood.

The flower pot is especially designed for grafting. The branch D is spliced to the parent limb C and then the split ring 2 is disposed around the parent limb. The sections A and B are now disposed around the parent limb and the branch and receive the bottom 2 in the groove 1. The wires 7 are made to encircle the parent limb C and the ends 8 and 9 are hooked together. The wires are now moved upwardly from the bottom of the pot and are forced over the projections 10. In this position, the wires securely hold the sections A and B together. The pot may be filled with either earth or other material for binding the branch D to the parent limb C.

After the grafting has been completed, the device may be removed without interfering with the tree or plant.

In Figures 6 to 9 inclusive, I show a slightly modified form of the device. This form differs from the form already disclosed in that staples 25 are used in place of the wire hoops 7. The sections X and Y are provided with eyelets 26 for removably receiving the staples 25. The staples secure the two sections together.

In all other respects, the modified form of the device is the same as the form of the device already disclosed and therefore needs no further description.

Although I have shown and described several embodiments of my invention, it is to be understood that the same is susceptible of various changes, and I reserve the right to employ such changes as may come within the scope of the appended claims.

I claim:

1. A plant propagating pot comprising a plurality of registering pot sections adapted for abutting engagement so as to present circumferential continuity, guide means for bringing the sections into registry, a split ring forming the bottom of the assembled pot, and ring-shaped members arranged in encircling relation with the pot sections for holding them together, each ring member having hook-shaped ends adapted to be engaged with each other and allowing the ends of the members to be spread apart.

2. A plant propagating pot comprising a plurality of registering pot sections adapted for abutting engagement so as to present circumferential continuity, a split ring forming the bottom of the assembled pot, and ring-shaped members arranged in encircling relation with the pot sections for holding them together, each ring member having hook-shaped ends adapted to be engaged with each other and allowing the ends of the members to be spread apart.

WAH LAM.